United States Patent
Mutalik et al.

(10) Patent No.: US 10,972,183 B2
(45) Date of Patent: Apr. 6, 2021

(54) N-INPUT RECEIVER: RFOG OBI MITIGATION WITH RETRANSMISSION

(71) Applicant: ARRIS Enterprises, Inc., Suwanee, GA (US)

(72) Inventors: Venkatesh G. Mutalik, Middletown, CT (US); Marcel F. Schemmann, Maria Hoop (NL); Dean Stoneback, Harleysville, PA (US); John Chrostowski, Warrington, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/677,443

(22) Filed: Apr. 2, 2015

(65) Prior Publication Data
US 2015/0304034 A1  Oct. 22, 2015

Related U.S. Application Data

(60) Provisional application No. 61/982,089, filed on Apr. 21, 2014.

(51) Int. Cl.
*H04B 10/2575* (2013.01)
*H04J 14/04* (2006.01)
*H04J 14/02* (2006.01)

(52) U.S. Cl.
CPC ...... *H04B 10/2575* (2013.01); *H04J 14/0282* (2013.01); *H04J 14/04* (2013.01)

(58) Field of Classification Search
None
See application file for complete search history.

(56) References Cited

U.S. PATENT DOCUMENTS 5,262,883 A   11/1993  Pidgeon
5,331,449 A   7/1994   Huber et al.
(Continued)

FOREIGN PATENT DOCUMENTS

EP   1235434 B1   10/2005

OTHER PUBLICATIONS

"OBI free", retrieved from the Internet at<http://www.emc-web.com/J_emc/index.php?option=com_content&view=article&id=165:obi-free&catid=47:paper&Itemid=182\> on Mar. 24, 2015.
(Continued)

*Primary Examiner* — David W Lambert
(74) *Attorney, Agent, or Firm* — Chernoff, Vilhauer, McClung & Stenzel, LLP (57) ABSTRACT

A multimode combiner or coupler (MMC) may combine the inputs into a larger core multimode fiber. The multimode combiner may be combined with a re-transmitting laser for detecting and re-transmitting signals. Thus, the multi-mode combiner may detect and combine input signals, and then retransmit the detected, combined signal. The detection can be implemented with multiple single mode fibers to small single mode detectors or a multi-mode coupler with a larger multi-mode detectors. In embodiments of the MMC, a bi-directional optical splitter/combiner includes a transmitter for re-transmitting an RF signal received at a receiver, a first wave division multiplexer (WDM) combiner combining the output of the first transmitter in an upstream direction to a downstream signal in a downstream direction, and a second WDM combiner combining split downstream signals in the downstream direction with upstream signals received via at least two optical fiber inputs.

9 Claims, 3 Drawing Sheets

(56) References Cited

U.S. PATENT DOCUMENTS

| | | | |
|---|---|---|---|
| 5,451,769 A * | 9/1995 | McAdoo | H01L 31/1085 250/214.1 |
| 5,914,799 A | 6/1999 | Tan | |
| 6,041,056 A | 3/2000 | Bigham et al. | |
| 6,873,801 B1 * | 3/2005 | Yamaki | H04B 10/505 398/197 |
| 7,941,022 B1 | 5/2011 | Schaffner et al. | |
| 8,837,953 B2 | 9/2014 | Mutalik et al. | |
| 2004/0218665 A1 * | 11/2004 | Baba | H04B 10/035 375/221 |
| 2006/0098986 A1 * | 5/2006 | Jung | H04B 10/66 398/140 |
| 2006/0127100 A1 * | 6/2006 | Frankel | H04B 10/29 398/158 |
| 2012/0308237 A1 * | 12/2012 | Mutalik | H04J 14/0298 398/116 |

OTHER PUBLICATIONS

A. Tan, "SUPER PON—A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical. Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

* cited by examiner

N-INPUT RECEIVER: RFOG OBI MITIGATION WITH RETRANSMISSION

CROSS-REFERENCE TO RELATED APPLICATIONS

This application claims the benefit of priority under 35 U.S.C. § 119(e) to U.S. Provisional Application No. 61/982,089, filed Apr. 21, 2014 entitled "N-Input Receiver: RFOG OBI Mitigation with Retransmission," the entire disclosure of which is incorporated herein by reference.

BACKGROUND

An existing impairment of RFoG communication channels is Optical Beat Interference (OBI), which afflicts traditional RFoG networks. OBI occurs when two or more reverse path transmitters are powered on, are very close in wavelength to each other, and are combined on a single mode fiber and directed to a detector. For more details on OBI, Applicants refer to application Ser. No. 13/151,257, which is herein incorporated by reference. OBI limits upstream traffic, but also can limit downstream traffic due to corruption of acknowledgements sent upstream. Existing efforts at mitigating OBI include adjusting ONUs to be wavelength specific, creating an RFoG-aware scheduler in the CMTS, changing ONU wavelengths in real-time, or RF combining multiple upstream inputs nominally in the same wavelength range.

However, such solutions for reducing or eliminating OBI require additional power, add cost or limit traffic throughput. For example, to combine multiple upstream inputs nominally in the same wavelength range without the occurrence of OBI requires power to drive the photodiodes and the retransmitting laser. Such OBI reducing/eliminating devices have OEO conversion in upstream and downstream to aid in downstream splitting that require additional downstream transmitting lasers, which also requires additional power and adds cost. Wavelength specific or adjustable ONUs are costly and can create logistical problems with different versions of ONUs. RFoG aware schedulers limit upstream transmissions to one ONU at a time this reducing the upstream channel throughput.

Improved techniques for reducing OBI in a network that do not reduce throughput with a minimal need for increased power are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DESCRIPTION

Disclosed herein are embodiments for an N-ary optical input receiver with retransmission combined with a downstream splitter with minimal power dissipation. As disclosed, a multiple input receiver or multimode combiner with a large detector is disclosed, with accommodations for reduced receiver performance due to large detector capacitance.

Figure 1:
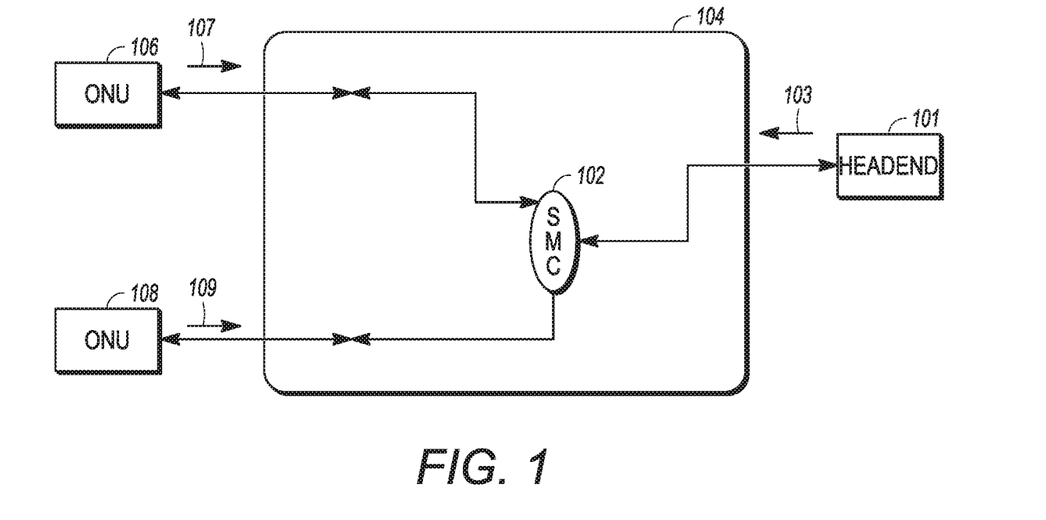
FIG. 1 depicts an example of a single mode coupler receiving downstream light.

FIG. 1 depicts an example of a single mode coupler 102 receiving downstream light 103. For simplicity, only the single mode coupler 102 is shown in the node 104, but one of skill in the art would understand that additional components are usually included in the node 104.

In fiber-optic communication, a single-mode optical fiber (SMF) (monomode optical fiber, single-mode optical waveguide, or unimode fiber) is an optical fiber designed to carry only a single ray of light (mode). Modes are the possible solutions of Helmholtz equation for waves, which is obtained by combining Maxwell's equations and the boundary conditions. These modes define the way the wave travels through space, i.e. how the wave is distributed in space. Waves can have the same mode but have different frequencies. This is the case in single-mode fibers, where we can have waves with different frequencies, but of the same mode, which means that they are distributed in space in the same way, and that gives us a single ray of light. Although the ray travels parallel to the length of the fiber, it is often called transverse mode since its electromagnetic vibrations occur perpendicular (transverse) to the length of the fiber.

As shown in FIG. 1, downstream light 103, for instance at a wavelength of 1550 nm, passes from the right to left, such as from a headend 101 in a CATV network towards a node 104/optical network unit (ONU) 106, 108. The downstream light 103 is passed through the single mode combiner at a point between the headend 101 and one or more ONUs 106, 108, such as at node 104 as shown. The ONUs are receive/transmit units that receive the downstream information and send upstream information 107, 109 at a different wavelength, for instance 1310 or 1610 nm. The upstream light reaches the single mode coupler for upstream transmission to the headend.

Optical signal sources have a significant phase noise. When two optical sources are combined, an additional signal is produced in a noise band around a center frequency, (w1-w2). If the frequency range of this unwanted signal band overlaps with wanted signals, the signal to noise ratio of the wanted signal may be severely impacted. The combined signal can have a very poor signal to noise ratio when w1 and w2 are close enough that the center frequency falls within the RF band. This is called optical beat interference (OBI) and is a practical problem. Any pair of lasers can have closely separated wavelengths so close that combining them on a single detector leads to optical beat interference (OBI), wherein the different frequency of the optical waves is detected and is within the RF signal band. Furthermore the passive combiner introduces a significant optical power loss (10*log(N) dB for an N-ary combiner) causing a reduced signal to noise ratio of the received signal even in the absence of OBI. Thus the return link loss budget is reduced.

Optical Beat Interference (OBI) and the limited return link budget are problems in RFoG return networks (see http://www.scte.org/documents/pdf/Standards/ANSI_SCTE_174_2010.pdf for an overview of RFoG networks). OBI can result in very high noise levels that can readily exceed the signal level, thus inhibit communication. The OBI problem is well known and is considered an impediment for RFoG implementations.

For point to multi-point RFoG networks in the upstream, two or more return lasers can be on at the same time; these lasers are combined with a passive combiner and detected by a single detector. In such networks typically a star splitter distributes light over 32 subscribers, the same splitter combines return light from the 32 subscribers at a penalty of 15 dB of loss. Also the optical combining of multiple sources at nominally the same wavelength can cause optical beat interference such that the information content can be overwhelmed by noise.

From a splitter that distributes light to subscribers and combines return light from the subscribers at a penalty, there can be a long link (e.g., up to 25 km with an additional 6 dB of loss) back to a headend or hub where the combined return sources are detected at a receiver. The total loss is high such that the SNR obtained after receiving the signals is degraded even when the receiver itself has a very low thermal noise contribution. Furthermore, typically up to 8 receiver outputs are combined into on CMTS return port that thus handles around 256 subscribers. In this combining the receiver thermal noise adds up and unless means are implemented on the receivers to turn them off in the absence of signal the SNR is degraded by a further 9 dB. With such means the SNR is still degraded by up to 6 dB when up to 4 return transmitters are on simultaneously, and that is a valid operation mode of the return network.

In case the 32 subscribers can be received individually at the star splitter location then the input power to the receiver is high, almost as high as the return laser power since the links to the star splitter are short. A high SNR is readily obtained and there is no OBI because the signals are not optically combined before they are detected. The combined signal of all received signals must then be re-transmitted over the long (25 km) fiber link and detected at the headend. At the headend multiple such return links need to be combined.

Disclosed herein is a multimode combiner or coupler (MMC) concept for combining all the inputs into a larger core multimode fiber, where the multimode combiner is modified for re-transmission. In embodiments, the multi-mode combiner is combined with a re-transmitting laser for detecting and re-transmitting. Thus, the multi-mode combiner may be detect and combine the input signals, and then retransmit the detected, combined signal. Previously techniques for multi-mode combiners require running a multi-mode fiber from the combiner/splitter all the way to the headed, and a multimode fiber is typically not available for this purpose. Using a single mode fiber to the headend, the disclosed multimode combiner is able to detect and re-transmit. The detection can either be implemented with multiple single mode fibers to small single mode detectors or a multi-mode coupler with a larger multi-mode detectors.

Figure 2:
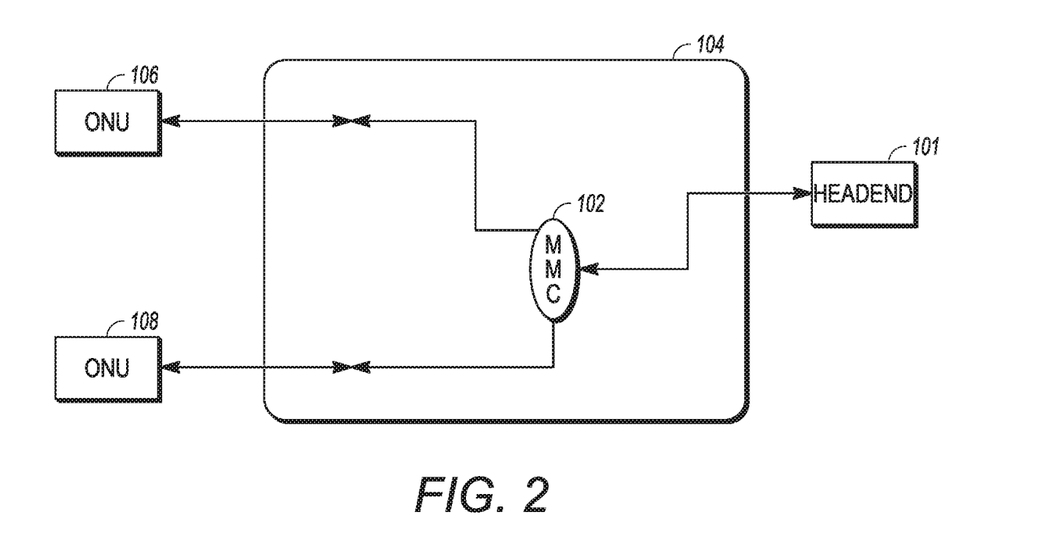
FIG. 2 depicts a multimode combiner or coupler (MMC)

FIG. 2 depicts a multimode combiner or coupler (MMC) that combines all the inputs into a larger core multimode fiber such that all the light provided at the input to the MMC coupler is preserved in the larger core fiber.

Multi-mode fiber has higher "light-gathering" capacity than single-mode optical fiber. In practical terms, a larger core size simplifies connections and also allows the use of lower-cost electronics such as light-emitting diodes (LEDs) and vertical-cavity surface-emitting lasers (VCSELs) which operate at the 850 nm and 1300 nm wavelength (single-mode fibers used in telecommunications operate at 1310 or 1550 nm and require more expensive laser sources.

Multi-mode couplers differ from single mode couplers in that they combine multiple input signals with a very low loss. Multimode couplers excite different output modes in the output arm of the coupler for each optical input signal (something that is not possible in a single mode device that can only output power in a single mode per arm). Light may be coupled from single mode to multimode fibers with a low loss; the single mode input will excite a matched mode pattern in the multimode waveguide. A system with multiple single mode fiber inputs each carrying an optical signal may be converted to a multimode signal, and with a multimode coupler be provided to a multimode output. Due to the low loss in this conversion process any optical beat interference is usually low.

Using a MMC, the RFoG system may include at least a first receiver with at least two optical fiber inputs that are provided to separate detector areas that can be located on one or more detectors, or to one detector area large enough to encompass the entire field of the combined beams. A photo detector coupled to the multi-mode optical combiner may detect a total optical power of the single mode optical signals in the multi-mode optical signal.

A photo-detector may be accurately modeled up to fairly high frequencies (~1 GHz) by a capacitance in parallel with a current source for reasonable input power levels (>1 uW). Conventional receiver designs use a trans-impedance amplifier or match the detector to as high an impedance as possible to convert the current source signal to an RF signal for amplification by an RF amplifier with the best possible noise figure. Both approaches are limited by the detector capacitance such that an increase in the number of detectors or detector area leads to a loss of detector performance and the number of that can work well with a single RF amplifier or trans-impedance amplifier may be limited. Thus a number of single mode detectors can be combined to a single trans-impedance amplifier, equivalently a multi-mode detector of limited size can be combined to a singe trans-impedance amplifier. To combine a large number of input signals multiple amplifiers are needed and the outputs of the amplifiers can then be combined to a single signal.

As shown by Table 1 below, a conventional system has a much lower receiver power than a multimode combiner or equivalently a combination of single mode detectors with re-transmission. However an RFoG receiver has a much better noise figure, on the order of 1 pA/sqrt(Hz) equivalent input noise can be expected. Still, the link SNR is much lower than that of the multimode combiner with re-transmission, as disclosed in more detail below.

TABLE 1

| Traditional HE receiver concept | |
|---|---|
| Plaser | 3 dBm |
| link | 25 km max to receiver |
| Link loss | 7.5 dB |
| combiner | 32 times |
| combiner loss | 16.1 dB |
| In | 1 pA/sqrt(Hz) |
| NF amp | 0 dB |
| | 1.0 pA/sqrt(Hz equivalent noise from pre-amp |
| Pdet | −20.6 dBm |
| R | 0.9 A/W |
| Ipd | 0.008 mA |
| shot | 1.6 pA/sqrt(Hz) shot noise |
| RIN | −155 dB/Hz |
| | 0.1 pA/sqrt(Hz) RIN |

TABLE 1-continued

Traditional HE receiver concept

| | |
|---|---|
| Noise total | 1.9 pA/sqrt(Hz) |
| B | 6 MHz |
| Noise | 0.0046 uA rms equivalent noise current on detector |
| mu | 10% effective modulation index |
| | 0.79 uA rms signal current |
| SNR | 45 dB overall SNR for a single link |

When 4 return links are simultaneously active on different headend receivers (of which typically up to 8 are combined into one CMTS RF port) this SNR degrades by another 6 dB to less than 40 dB. The performance is even worse if the receivers do not have a low squelch function (that turns the receivers off when there is no input).

As described herein, a multi-mode combiner or a multi-detector concept results in significantly higher SNR than conventional systems and is OBI free. The number of optical inputs per MMC can be significant without affecting the receiver performance as long as the detector size and thus its capacitance is sufficiently limited to permit coupling the detector to a trans-impedance amplifier or RF amplifier. Particularly for lower bandwidth as in. RFoG systems a high number of optical inputs can be combined. Similarly the capacitance due to combining a high number of single mode detectors into a single trans-impedance amplifier or RF amplifier can be acceptable.

Figure 3:
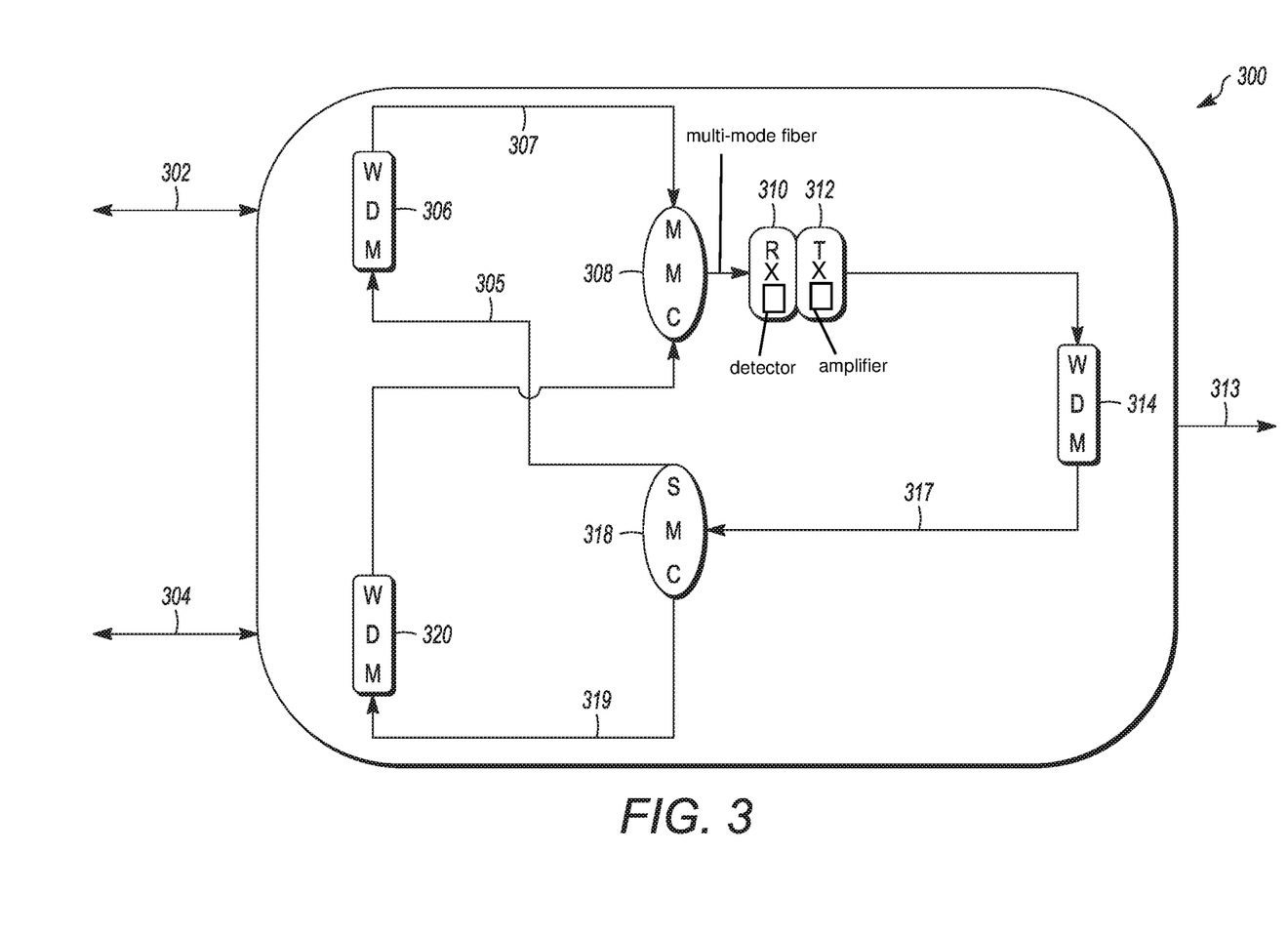
FIG. 3 depicts a multi-mode combiner (MMC) topology for employing OBI techniques.

FIG. 3 depicts an embodiment for a multi-mode coupler topology 300 for employing OBI mitigation techniques in an optical splitter/combiner. A multimode combiner may combine single mode optical signals received into a multi-mode optical signal. Assume that in FIG. 3, the multimode coupler may be used to combine multiple single mode fiber inputs with optical frequencies sufficiently close that optical beat interference could occur, i.e., frequencies are close enough to cause optical beat interference.

Upstream light may pass from left to right, for instance at a wavelength of 1310 or 1610 nm. Downstream light may pass from right to left, for instance at a wavelength of 1550 nm. The system depicts a first transmitter re-transmitting the RF signal from the first receiver and a second receiver receiving the light from the first transmitter. Note this formulation may cover both the multimode coupler implementation and the multiple detector implementation, where both implementations enable a detect and re-transmit of a plurality of signals. For the multiple detector implementation the multimode combiner 308 is not present, and the light paths 307 go directly to several detectors that are operated in parallel in receiver 310.

At the upstream input to 300, incoming upstream light from fiber 302 or 304 is first separated from downstream light, for instance at a wavelength of 1310 or 1610 nm on a WDM (Wavelength Division Multiplexing) component 306 that outputs upstream light to 307 to multi-mode optical combiner 308.

If the output of the multimode fiber is coupled to a photo detector, the detector measures the sum of all input powers without optical beat interference as long as the detector is large enough to capture the complete output beam of the multimode fiber. Typical multimode fibers have core diameters in the order of 50-80 um. Typical detector diameters for GHz range detectors are on the order of 50 urn. Lower frequency detectors can be larger, for instance for systems with response up to 50 or 100 MHz. As shown in FIG. 3, a receiver with photo detector 310 may be coupled to the multi-mode optical combiner and detect a total optical power of the single mode optical signals in the multi-mode optical signal output from the multi-mode optical combiner 308.

The output of photo detector 310 is provided to transmitter 312 that outputs light to WDM 314 that is output in upstream direction to fiber 316, such as to a headend.

The RFoG system may include a plurality of multi-mode optical couplers, each formed and arranged to couple a plurality of single mode optical signals from the plurality of single mode optical fibers to one of the multi-mode optical fibers. In embodiments, each single mode optical signal has a distinct optical mode that does not interfere with the optical mode of the other single mode optical signals in such a way that light would be lost from the multi-mode signal. A photo detector coupled to each multi-mode optical fiber may be formed to detect a total optical power of a multimode signal from a multi-mode optical fiber to which it is coupled. An amplifier may receive the output of each photo detector. The outputs of amplifiers may be combined before re-transmission.

Downstream light is input from fiber 313 to WDM 314 that outputs to splitter 318 and that puts out downstream light, such as 305 or 319, that is then provided to optical components (such as thin film filters) 306 or 320 that each output downstream, optical power to upstream fibers 302, 304 going to subscribers (to the left). The subscribers have receive/transmit units (ONUs, not shown here) that receive the downstream information and send upstream information at a different wavelength, for instance 1310 or 1610 nm.

As illustrated in FIG. 3, upstream information is passed by the optical components 306 and 320 to fiber such as 307 and reaches a multimode combiner (MMC) 308 that combines all the inputs into a larger core multimode fiber such that all the light provided at the input to the MMC coupler is preserved in the larger core fiber connected to receiver 310. Return signals are combined by the coupler, e.g., MMC 308. For a coupler of the right type this combination may be low-loss for the return signals. Forward path signals from single mode fiber 313 are provided to WDM 314 that passes forward path signals to fiber 317 that goes to single mode splitter 318 with fibers 305 and 319 providing the split forward path signals to WDM components 306 and 320. The WDM components 306 and 320 pass downstream, light to fibers 302 and 304 where the forward split may distribute power evenly over the output ports. The low loss combiner is OBI free and the combined return signal is detected after the combiner 308.

As shown in FIG. 3, from the MMC 308 the signal is provided to a large area detector (PD) (part of receiver 310) providing a signal to an amplifier (AMP), which may be part of receiver 310 and/or transmitter 312 for driving the respective component to which it is integrated. For example, the amplifier may drive a transmitter (TX) 312, sending a signal to the WDM combiner (WDM) 314 that is connected to a fiber 316 that leads to the head-end. It is noted that for detecting a multimode fiber signal from a large core fiber output from MMC 308, implicitly a larger detector is needed than for detecting a single mode fiber signal. The large area detector in RX 310 has increased capacitance and this can limit the bandwidth of the receiver. However, this implementation can have practical implementations that still meet the requirements. An alternate embodiment uses multiple detectors that may be amplified and then the signals can be RF combined, for instance one detector can be used at each fiber 307.

As also shown in FIG. 3, the RFoG system may utilize a single mode fiber 313 running from a headend to a node;

from the node the signals are distributed to the end user devices over relatively short links 302, 304 (e.g. less than half the link distance from the headend to the node). In embodiments, a headend has multiple outgoing fibers, each fiber such as fiber 313 also configured to provide return signals to the headend, and these return signals need to be combined before being applied to an optical receiver in the headend. The use of a single mode (SM) combiner such as SM combiner 318 would cause OBI in case the upstream signals were passed to that combiner. The use of a MM coupler such as MMC 308 where the upstream signals are passed to that coupler may reduce or prevent OBI.

The disclosed concepts for OBI free receiver may work on systems such as that described in EP Publication number EP1235434 B1, which is incorporated herein by reference. As described in EP Publication number EP1235434 B1, a telecommunications network for cable distribution of television signals includes a two-way optical fibre network for distributing television signals to a subscriber's premises without using coaxial cable, in such a way that the transmission of CATV signals and the broadband return path are facilitated and the distortions are minimized in such a way as to improve the quality of the television image and the bandwidth accessible by each subscriber.

Most television signal networks use a system of data transmission via coaxial cables for a final distribution to the customers. HFC coaxial cable transmission issues include accumulated noise in the return path, in the disturbances entering via insufficiently screened existing coaxial cable, and in the limitation of the useful bandwidth. These problems increase with an increase in the number of users connected via modem.

EP1235434 B1 describes replacement of existing coaxial cables with a certain number of optical fibres which have the advantage of permitting a high data transmission capacity, to enable the transmission of analog and digital television signals and ensures compatibility with the radio-frequency modem-based data transmission system. The solution proposed by EP Publication number EP1235434 B1 enables the television signal to be carried by optical means to the subscriber's premises, and makes it possible to have a return path consisting entirely of optical fibre for carrying the data from the subscriber's premises, at low cost, and in such a way as to maintain flexibility with the existing type of network.

More particularly, EP Publication number EP1235434 B1 describes having a first optical fibre input for the entry of broadband optical AM television signals from the last optical node, a number N of optical fibre outputs for the transmission of the optical signals whose number depends on the number of subscribers to be connected, a number M of optical fibre inputs which connect an optical interface present at the premises of each individual subscriber to the equipment in question, an optical fibre output to which is sent the optical signal carrying the data from the premises of the individual subscribers, and a coaxial connector output to maintain the system's compatibility with conventional electrical signals. The said coaxial connector output is used if the first portion of the CATV network is of the coaxial type. In the present description and in the claims, the said equipment for external use is called a "dual broadband optoelectronic repeater".

In embodiments, the terms "head end" or "CATV head end module" or "station" denote the place and devices which transmit the broadband AM television signal optically in the optical fibre network, and in which the reception and demodulation of the sum of the optical signals arriving from the individual subscribers are carried out. Additionally, the term "outgoing path" indicates the components of the network which carry the broadband CATV signal from the station (head end) to the premises of each user, and the term "return path" indicates the components of the network which carry the data-containing signals from the premises of the individual subscribers to the station (head end).

The first optical fibre input is terminated with an optoelectronic receiver which can convert the broadband AM CATV optical signals to electrical signals. The electrical signals produced in this way are amplified. The amplified electrical signals are then divided by an RF splitter and sent to N laser sources. The N laser sources are supplied independently via an output optical power control circuit. A CPU connected to the output optical power control circuit enables the N laser sources to be switched off and on remotely, thus permitting the simple remote disconnection and connection of each subscriber. The N laser sources implement a conversion of the received electrical signal to an optical signal and send it, via N optical fibre outputs, directly to each subscriber. The equipment for external use has another M optical fibre inputs, which carry the return path signal from the individual subscribers, which is converted to an electrical signal by an array of M optoelectronic receivers. The M optoelectronic receivers are also switched on and off independently and remotely by the said CPU.

An RF combiner adds together the M electrical signals produced by the said M optoelectronic receivers and sends the resulting sum to an amplifier. The amplifier is connected to a switch that can switch the sum to a separating filter or to a laser transmitter for the return path. The laser transmitter for the return path converts the said sum to an optical signal and transmits it by optical fibre to the station. The separating filter is connected to the said output by a coaxial connector. The dual broadband optoelectronic repeater in question makes it possible to use the whole signal band provided by an optical fibre but only to the extent that this bandwidth is supported by the optoelectronic receivers and laser transmitters, and therefore has the advantage of permitting the frequency allocation of the carrier signals in the frequency ranges where non-linear phenomena have less effect, thus providing an improvement in the non-linearity of the system in both the outgoing path and the return path. Moreover, because of the large bandwidth of the optical fibre, it enables the flatness of the channel level to be maintained throughout the band, without the need for further equalization systems, thus providing a uniform quality of the television image in all channels. A further advantage of the cited invention is that, as well as providing the individual subscriber with access to the whole available bandwidth of the optical fibre for data transfer, it makes it possible to use a network topology of the point-to-point type in which the individual subscriber has a dedicated optical fibre channel, without branches between the socket installed at his premises and the final optical transmitter or receiver in the dual broadband optoelectronic repeater. This topology is suitable for the use of numerous protocols at the transport level and is flexible and robust in terms of security. The point-to-point topology also allows simple remote disconnection of each subscriber according to the requirements of the network controller. Finally, particular mention should be made of the absence of costly additional passive optical components such as optical isolators, filters and amplifiers; the compatibility with coaxial cable networks; and the intrinsic immunity of the optical fibre to electromagnetic disturbances.

The aforementioned patent suffers from a number of limitations; some of these are discussed next. For each optical input an optoelectronic receiver is used resulting in additional component cost, dissipation and noise accumulation from the active receivers. Alternately, multiple optical inputs are aggregated to one photo detector with a larger area. In the forward path receiving, amplifying and retransmission of forward signals with one laser per subscriber adds considerable cost and power dissipation and the laser transmitters are bandwidth limited compared to the real optical bandwidth available from the fiber.

Disclosed are embodiments for implementing in the optical combiner unit a multi-mode combiner. This may be accomplished in unidirectional or bidirectional configurations. A unidirectional system provides no control communication signals from an active optical splitter to an ONU, i.e. control communication signals only pass from an ONU to an active splitter. Thus, in a unidirectional system, an active optical splitter simply accepts an output level from an ONU and operates with that output level. A bidirectional system passes control signals from an active optical splitter to ONUs instructing them to adjust their output power; this type of system permits accurate equalization of the input levels to the active optical splitter from each ONU.

The multimode combiner concepts disclosed herein are proposed to overcome the limitations of multiple optical input receiver concepts, such as those described in the aforementioned EP Publication number EP1235434 B1.

Figure 4:
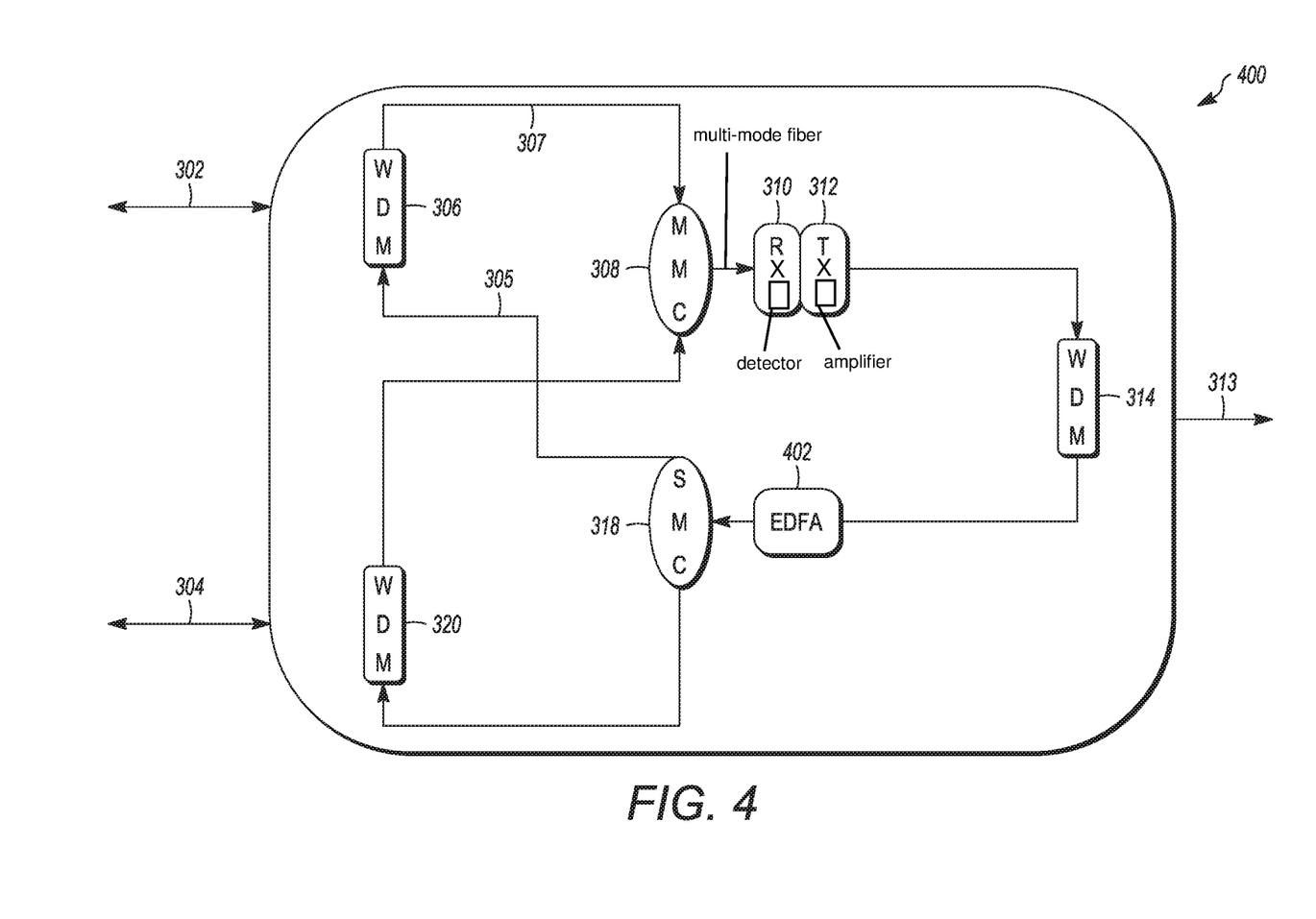
FIG. 4 depicts use of a multi-mode combiner similar to the topology shown in FIG. 3, further including an EDFA.

FIG. 4 depicts use of a multi-mode combiner in an optical splitter/combiner similar to the topology shown in FIG. 3, also including an EDFA 402. It should be recognized that if a small amount of power is provided to power a receive/transmit 310/312 function, then further power may be provided to an EDFA 402. Thus an active splitter combiner 400 can be provided that resolves not only the upstream bottlenecks of an RFoG system but also the downstream limitations, by providing amplification in the downstream path without needing to resolve to receiving, amplifying and transmitting downstream signals. This is preferably done with an EDFA 402 in the downstream signal path as shown in FIG. 4.

In embodiments, an active optical splitter with a splitter and wavelength selective components directs upstream light from output fibers at least one wavelength band to a multitude of detectors and passes downstream light to and upstream light of other wavelengths from the output fibers and at least one upstream transmitter.

Often RFoG systems are installed with the intent to replace them with PON systems in the long run. In order to do so the splitters and combiners that have been installed should preferably be re-usable. In other cases RFoG systems should be as low cost as possible.

If the design priority is to install the lowest cost implementation, then 1310 nm upstream transmission may be used embodiments related to using a multimode coupler (MMC) such as that shown in FIG. 3 and using a MMC with an EDFA such as that shown in FIG. 4. Similar considerations apply to the embodiments related to using a multimode coupler (MMC) and using a MMC with an EDFA.

It is noted that because the receiver disclosed herein may result in a 32-input receiver with just a single amplifier, there may be low power dissipation so that many low-power options become available to power it. Example powering options include a) If RFoG is in an MDU: Use the MDU power with UPS and battery backup for the active splitter, b) If RFoG is a New Build: Pull Copper along with Fiber to light up the Active Splitter along with a battery backup, c) If RFoG is an extension to HFC: Siphon power from the HFC plant along with a battery backup, d) If RFoG is on a Utility Pole: Siphon power from the Utility company along with a battery backup, e) See if RFoG can be co-located with the Wireless Access Points. Wireless RFoG, f) See if RFoG active filter can have Solar Power. Those prices have come down, g) See if RFoG can have Fiber Power, either as a SM pumping or as MM pumping from the ONU or from the Headend.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Embodiments include:

An RFoG system with at least a first receiver with at least two optical fiber inputs that are provided to separate detector areas that can be located on one or more detectors or to one detector area large enough to encompass the entire field of the combined beams, a first transmitter re-transmitting the RF signal from the first receiver and a second receiver receiving the light from the first transmitter.

An RFoG system with an optical receiver as one of the above, receiving wavelengths sent upstream by ONUs (home terminating RFoG equipment with transmit and receive functions).

As above with a downstream wavelength that is transmitted to the ONUs. As above with an EDFA that amplifies the downstream wavelength. As above where there is at least one multimode combiner.

An active optical splitter with a splitter and wavelength selective components reflecting downstream light at least one wavelength band away from a multitude of detectors to output fibers and passing upstream light from the output fiber of at least one other wavelength to the detectors and at least one upstream transmitter.

We claim:

1. A bi-directional optical splitter/combiner functioning passively in a downstream direction and active in an upstream direction, the bi-directional optical splitter/combiner comprising:
   at least two optical fiber inputs for receiving upstream signals;
   at least one optical receiver for receiving a radio frequency over fiber (RFof) modulated signal, the at least one optical receiver including at least one optical detector that uses a photo detector having a size configured to detect and retransmit at an optical receiver output a signal that carries the total optical power received from a plurality of optical signals having different wavelengths, and without optical beat interference occurring in the retransmitted signal;
   a first optical transmitter for receiving the RFof modulated signal from the optical receiver output and re-transmitting the RFof modulated signal from the at least one receiver, the first optical transmitter providing an output;
   a first wave division multiplexer (WDM) optical combiner combining the output of the first optical transmitter in an upstream direction to a downstream optical signal in a downstream direction;
   an optical splitter for splitting the downstream optical signal to provide at least two split optical downstream signals; and
   a second WDM optical combiner combining each split optical downstream signal in the downstream direction with the upstream signals received by the at least two optical fiber inputs.

2. The bi-directional optical splitter/combiner of claim 1, further comprising:
   at least one single mode to multi-mode optical combiner combining at least two signals received at the at least two optical fiber inputs to a multi-mode fiber output; and
   the at least one optical detector formed large enough to encompass an entire field of combined beams from the multi-mode fiber output.

3. The bi-directional optical splitter/combiner of claim 1, further comprising wavelength selective optical components for directing upstream light at a first wavelength and passing downstream light at a second wavelength.

4. The bi-directional optical splitter/combiner of claim 1, further comprising a multi-mode optical combiner (MMC) for combining inputs from one or more optical fibers for transmitting a multimode signal into a multimode fiber sufficiently large to transmit all light provided at the input to the MMC, the multimode fiber having a core larger than a single-mode fiber to preserve the light in the larger core multimode fiber.

5. The bi-directional optical splitter/combiner of claim 4, wherein the at least one optical detector is large enough to provide a detector output signal to an amplifier, the amplifier driving the first transmitter and sending a signal to the first WDM optical combiner connected to a fiber extending to a headend.

6. The bi-directional optical splitter/combiner of claim 4, wherein the at least one optical detector has a size large enough for detecting the multimode fiber signal from the larger core multimode fiber and a corresponding capacitance related to the size of the optical detector.

7. The bi-directional optical splitter/combiner of claim 1, further comprising at least one optical receiver for receiving wavelengths sent upstream by optical network units that terminate radio frequency over glass (RFoG) at a customer premises with transmit and receive functions.

8. The bi-directional optical splitter/combiner of claim 1, transmitting wavelengths downstream to optical network units that terminate radio frequency over glass (RFoG) at a customer premises with transmit and receive functions.

9. The bi-directional optical splitter/combiner of claim 8, further comprising an erbium doped fiber amplifier (EDFA) that amplifies the downstream wavelengths.

* * * * *